Aug. 3, 1943.          A. KEEFE          2,325,685
AIR VALVE
Filed Feb. 20, 1940

INVENTOR
*ARTHUR KEEFE*
BY
O.Z. McCoy
ATTORNEY

Patented Aug. 3, 1943

2,325,685

UNITED STATES PATENT OFFICE 2,325,685

AIR VALVE

Arthur Keefe, Akron, Ohio

Application February 20, 1940, Serial No. 319,939

10 Claims. (Cl. 277—42)

This invention relates to air valves and more particularly to valve assemblies for use with pneumatic tires and is a continuation in part of my co-pending application, Serial No. 134,114, filed March 31, 1937, which issued February 11, 1941, as Patent No. 2,231,449.

An object of the present invention is to provide simplified and improved air valves of low cost that consist of small numbers of standardizable parts that may be readily constructed on ordinary machines and that are easily and inexpensively assembled.

Another object is to provide valve adaptations having simple functioning parts that may be conveniently installed and replaced.

With the above and other objects in view that will be apparent to those who are familiar with the art to which the present invention pertains, suitable illustrative embodiments of the invention are disclosed in the accompanying drawing, wherein.

Figure 4:
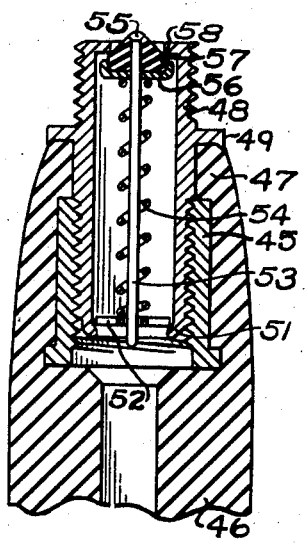
Figure 5:
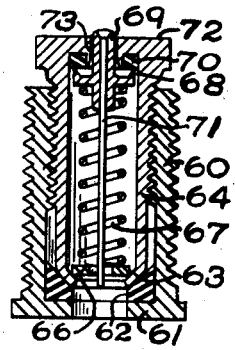

Fig. 4 is a fragmentary elevational section of a dust cap releasable air seal valve core, with an insert or ferrule embedded in the rubber stem that forms the outside permanent air seal between the insert and the stem; and Fig. 5 is an elevational section of an insert or ferrule and valve core assembly comprising a dust cap releasable air seal wherein the rubber valve seat is positioned to avoid the accumulation thereon of sand particles and the like, and providing an inwardly disposed permanent air seal.

Figure 1:
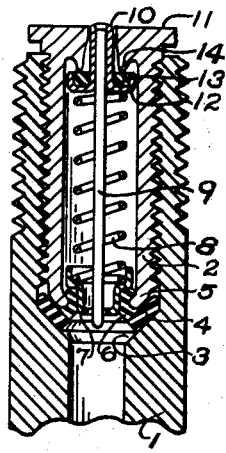
Fig. 1 is a fragmentary elevational section of a valve stem and core assembly comprising a dust cap releasable air seal and an inwardly disposed permanent air seal.

In the dust cap form of releasable air seal that is shown in Fig. 1 of the accompanying drawing, the tubular metal stem 1, that may be all metal as shown, or replaced by a similarly constructed insert or ferrule in a stem of rubbeer or other suitable material, as desired, terminates upwardly in a free end that is threaded internally to engage a suitable dust cap valve core, such as the removable, externally threaded thimble 2. The stem 1 also preferably has a permanent air seal face disposed in its interior for engaging the valve core, such as the preferably frusto-conical face 3.

The permanent air seal includes the rubber washer 4 that is interposed between the inturned edge 5 of the side wall of the thimble 2 and the stem face 3. The packing washer 4 is placed under compression by the rotation of the thimble 2 within the stem 1. Where desired, the rubber bushing 6 may be interposed radially between the thimble edge 5 and the thimble plug 7, and may be vulcanized to or otherwise interposed between the thimble lower edge 5 and the plug 7. The plug 7 serves as a support for the compression spring 8 and is apertured centrally to permit the free passage of air therethru and to serve as a guide for the lower end of the valve pin 9.

The upper end of the valve pin 9 is anchored in the dust cap plug portion 10, that forms dust and water sealing engagement with the air admitting aperture that is disposed centrally of the thimble top 11. The plug 10 carries the air seal valve cup 12 in which the air seal valve ring 13 of rubber, leather, or other suitable materal, is disposed. The substantially circular knife edge 14, of the thimble top 11, preferably inclines radially away from the upper end of the plug 10 to permit the free passage of air therebetween on the depression of the plug 10 against the yielding resistance of the spring 8.

The periphery of the thimble top 11 provides a grip for tools, such as pliers, a wrench, the fingers or the like, for assembling or disassembling the valve core or thimble 2 in the stem 1.

Figure 2:
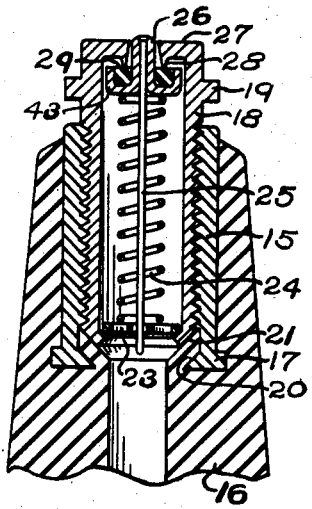
Fig. 2 is a fragmentary elevational section of a rubber valve stem, a ferrule or insert and a dust cap releasable air seal core assembly wherein the valve stem rubber provides the internal permanent air seal between the core and the stem.

The insert or ferrule 15, that is shown in Fig. 2, is preferably embedded in and vulcanized to the rubber valve stem 16 and is preferably vulcanized on both radial surfaces of the ferrule bottom flange 17. The ferrule 15 is threaded internally for the reception of the externally threaded lower part of the valve core thimble 18. The thimble tool rib 19 provides a tool grip on the thimble 18 so that the valve stem rubber packing that overlies the ferrule preferably fristo-conical radially inner face 20, may be compressed by the thimble preferably frusto-conical face 21 of the inturned flange that forms the lower extremity of the thimble 18, to provide a permanent air seal therebetween. The inturned flange that forms the lower extremity of the thimble 18 also supports the spider or apertured disc 23 on which the spring 24 rests. The spider 23 is apertured centrally to provide a guide for the lower end of the valve pin 25.

The dust cap plug 26, in which the pin 25 is suitably anchored at its upper end, makes dust and water sealing engagement with the air intake and exhaust aperture that is disposed centrally of the upper face 27 of the thimble 18 of the valve core. The axially downwardly extending knife edge 28 of the upper face of the thimble 18 is releasably engaged in air sealing contact by the valve rubber ring 29 that is carried by the plug 26 in suitable means, such as in the valve cup 43.

Figure 3:
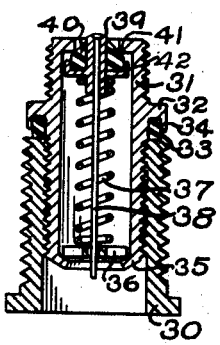
Fig. 3 is an elevational section of an insert or ferrule and valve core assembly wherein the dust cap releasable air seal has an inclined face and wherein the permanent air seal is disposed externally of the assembly.

The insert or ferrule 30, that is shown in Fig. 3, is threaded internally for the reception of the externally threaded lower part of the thimble 31. The radially projecting rib 32, that is disposed between the ends of the thimble 31, provides a finger or a tool grip for use in the assembly and the disassembly of the thimble and ferrule.

The packing rubber ring 33 is disposed on the under side of the rib 32 and provides a permanent, exteriorly disposed air seal between the axially upper edge of the ferrule 30 and the thimble 31. The axially downwardly extending flange 34 of the rib 32, assists in retaining and supporting the permanent air seal rubber ring 33 in place. The rubber ring 33 may be vulcanized to the thimble or otherwise secured in place, if desired. The insert or ferrule 30 may also be replaced with a metal valve stem, if desired.

The lower edge 35 of the thimble 31 is inturned to support the apertured disc or spider 36 on which the spring 37 rests. The spider 36 is apertured at substantially its center for the passage therethru and the guidance of the lower end of the valve pin 38. The valve pin 38 is anchored at its upper end in the dust cap air seal plug 39. The plug 39 carries the preferably frusto-conical rubber valve ring 40, that makes releasable air sealing engagement with a sharp edged inwardly extending annular rib comprising a valve seat and preferably with the corner edge 41 thereof, which rib defines the air transmitting aperture in the top of the thimble 31. The ring 40 is supported in any desired manner, as by being disposed in the valve cup 42. The dust cap air seal plug 39 may be made to provide a substantially dust and water excluding engagement with the centrally disposed aperture in the top of the thimble 31.

The insert or ferrule 45, that is shown embedded in the rubber valve stem 46 in Fig. 4, is disposed below and inwardly of the axially outermost packing rim 47 of the rubber stem 46. The ferrule 45 is threaded internally for the reception of the externally threaded lower portion of the thimble 48.

The thimble rib 49 extends radially of and between the ends of the thimble 48. The thimble rib 49 provides a tool grip for turning the thimble 48 down into the ferrule 45 and for compressing the rubber stem rim 47 between the rib 49 and the upper end of the ferrule 45 to provide a permanent air seal therebetween.

The inturned lower edge 51 of the thimble 48, supports the apertured disc or spider 52. The spider 52 permits the free passage of air therethru and is apertured centrally to provide a guide for the lower end of the valve pin 53. The spider 52 also acts as a support for the spring 54.

The valve pin 53 terminates upwardly preferably in an enlarged upper end 55 that provides a metal to metal contact for an inflation or deflating pin that forms a part of the ordinary tire inflating connector or chuck. The valve pin 53 carries the valve supporting plate 56 spaced from its upper tip and rigidly secured to the pin 53. The valve 57, that is preferably conical in shape, contacts the axially lower edge 58 of the air transmitting aperture in the top of the thimble 48 and makes a releasable air sealing engagement therewith. The pin end 55 may, if preferred, be sufficiently large to make a dust and water seal with the aperture in the top of the thimble 48.

The insert or ferrule 60, that is shown in Fig. 5, has a radially extending lower flange 61 at its base that supports the permanent air seal rubber packing ring 62 on its axially upper face. The flange 61 may also continue radially outwardly of the ferrule 60, if desired, to improve the anchorage of the ferrule in a rubber valve stem in which the ferrule may be vulcanized. The ferrule 60 may be replaced by a metal stem, if desired.

The inturned lower edge 63 of the dust cap or thimble 64, that threads into the ferrule 60, places the rubber ring 62 under compression and thus provides a permanent air seal between the ferrule and the thimble. The thimble edge 63 also supports the spider or apertured washer 66 on which the compression spring 67 rests.

The spring 67 releasably presses the knife edge 68 of the dust cap plug 69 against the valve seat 70 that is of suitable material, such as rubber, composition, leather or the like. The upper end of the valve pin 71 is securely anchored in the plug 69 in any desired manner. The valve seat 70 is preferably firmly secured to the under side of the top 72 of the thimble 64 in any desired manner, as by the axially extending flange 73 and may be vulcanized in place if desired. This construction has the advantage over the previously disclosed constructions that sand grains, dust particles and the like, will not accumulate on the valve seat and thereby become interposed between the valve knife edge 68 and the valve seat 70 and interfere with the efficiency of the releasable air seal that this engagement provides. The axially extending flange 73 preferably inclines downwardly radially away from the dust cap plug 69, with which it makes a dust and water seal at its upper end so that ample space is provided for the free passage of air therebetween on the depression of the dust cap plug 69 against the upwardly directed yielding pressure of the spring 67.

It is to be understood that the particular parts of these constructions that are disclosed herein and the rubber and the metal valve stems may be interchanged, where suitable operative constructions result from such interchange, and that the parts and the constructions that are disclosed and described herein are presented for purposes of illustration and explanation and that various changes, modifications and alterations may be made therein without departing from the invention as defined in the appended claims.

What I claim is:

1. An air valve assembly, comprising in combination, a rubber valve stem, an insert vulcanized in an end of said valve stem, a flange on the lower end of said insert and covered on both of its radial sides with the rubber of said stem, a thimble removably disposed in said insert and applying pressure against said stem rubber between said thimble and said insert flange, a tool rib part of said thimble having a periphery disposed radially inwardly of the periphery of said stem projected and for moving said thimble with respect to said insert, a dust cap plug slidably insertable in a downwardly flaring air transmitting aperture in the top of said thimble to minimize the entrance of objectionable dust and water into said thimble and terminating downwardly in a valve cup, a knife edge part of said thimble at the periphery of the axially lower end of the aperture in said thimble, a valve sealing material in said valve cup adapted to engage with the knife edge to releasably prevent the passage of air therebetween, a valve pin having its upper end anchored in said plug and extending downwardly of said thimble, a spring bearing upwardly against the under side of said plug for releasably maintaining said valve sealing material in air sealing engagement with said knife edge, and means disposed beneath said spring to provide support therefor and apertured substantially centrally for guiding the movement of the lower end of said valve pin.

2. An air valve assembly, comprising in combination, a rubber valve stem, an insert disposed in an end of said valve stem, a substantially radially extending flange portion of said insert underlying the rubber of said stem on both of the axial sides of said flange, a thimble removably disposed in said insert and apertured in its upper end for the conduction of air therethru, a lower edge of said thimble adapted for applying pressure to the stem rubber axially overlying said insert flange to effect an air seal therewith, a knife edge valve seat part of said thimble disposed as the peripheral lower edge of said thimble aperture, a closure means permanently mounted in said thimble and removably insertable in said thimble aperture for minimising the admission of objectionable foreign matter thereinto, a resilient material valve part of said closure means adapted for removably engaging said knife edge valve seat and releasably preventing the passage of air therebetween, a valve pin depending from said valve, and valve seating means yieldingly urging said valve against said valve seat.

3. A capless air valve, comprising in combination, an internally threaded tubular member, an externally threaded thimble removably disposed in said member and radially constricted at its upper end to provide an air conducting aperture therein, packing interposed between said thimble and said member and providing an air seal therebetween, a valve pin mounted for axial movement in said thimble, a valve on the upper end of said valve pin and having a portion normally substantially closing said aperture against the objectionable entrance of dust and water into said thimble, and means in and supported by said thimble for yieldingly supporting and maintaining said valve in its closed position.

4. A capless air valve, comprising in combination, an internally threaded tubular member, an externally threaded thimble removably disposed in said member and constricted radially at its upper end to provide an air conducting aperture therein, packing interposed between said thimble and said member and providing an air seal therebetween, a valve pin mounted for axial movement in said thimble, a valve on the upper end of said valve pin and having a portion normally substantially closing said aperture against the objectionable entrance of dust and water into said thimble, means in said thimble for yieldingly maintaining said valve in its normal position, and means in said thimble for guiding the lower end of said valve pin and for supporting said means for maintaining said valve in its normal position.

5. A capless air valve assembly, comprising in combination, an insert, a thimble insertable in said insert and having a radially extending rib overlying the outer end of said insert, packing means interposed between said end of the insert and said rib exteriorly of said insert and thimble, said thimble having an aperture adjacent its outer end and being provided with a substantially sharp edged inwardly extending annular rib defining a valve seat, a valve in said thimble and comprising yielding material and supported against spreading at both its inner and outer radial peripheries and adapted to engage said valve seat, a valve pin depending from said valve, a spring in said thimble and bearing against said valve to support and normally seat the same, and means supporting said spring and for guiding the movement of said valve pin in said thimble and supported by said thimble.

6. A capless air valve assembly, comprising in combination, an internally threaded tubular member, a radially inwardly extending flange part of said member, a thimble insertable in said member and apertured at its outer end for the passage of air therethru and provided with an axially extending flange defining the lower edge of said thimble aperture, a packing supported by said member flange and interposed between said member and said thimble, a valve seat disposed radially outwardly of said thimble flange and arrested from radially inwardly directed displacement thereby, a valve in said thimble and adapted for engaging said valve seat and having a portion normally substantially closing said thimble aperture against the entrance of objectionable foreign matter into said thimble, a valve pin depending from said valve, a spring in said thimble and bearing against said valve to support and normally seat the same, and means supporting said spring and for guiding the movement of said valve pin in said thimble and supported by said thimble.

7. A capless air valve assembly, comprising in combination, an internally threaded insert, an externally threaded hollow thimble removably disposed in said insert and having a radially outwardly extending rib overlying the outer end of said insert and having a substantially sharp edged radially inwardly extending annular rib at the outer end of the thimble defining an air conducting aperture therethru and providing a substantially sharp edged valve seat, a valve in said thimble and comprising yielding material and supported against spreading at both its inner and outer radial peripheries and adapted to engage releasably said valve seat, a valve pin depending from said valve, a spring in said thimble and bearing upwardly against said valve to support and normally seat the same, and a valve pin guiding means supporting said spring and supported by said thimble.

8. An air valve, comprising in combination, a hollow tube threaded internally, a capless thimble core threaded externally for being removably disposed in said tube and having an air conducting aperture therein, an air seal packing material compressed between said tube and core, a valve pin axially movable in and indirectly supported by said core, a valve disposed at substantially the upper end of said pin, air sealing material interposed between said core and said valve for preventing the passage of air therebetween when said valve is in its normal closed position, a dust cap closure part of said valve slidably removably insertable in the core aperture and cooperating with substantially the periphery of said core aperture for minimizing the entrance of objectionable dust and water therethru, means supporting said air sealing material for said valve against deformation toward the radial center of said valve, means restricting the deformation of said air sealing material radially outwardly of said valve, and means in and supported by said thimble core for yieldingly maintaining said valve in its closed position.

9. A capless valve core for replaceable insertion in a valve stem, comprising in combination, a hollow thimble adapted for being removably secured within said valve stem, a wrench engageable rib part of said thimble extending substantially radially therefrom for being engaged by a tool in causing the rotation of said thimble in said stem and not extending radially beyond the periphery of said stem projected, a knife edge valve seat at the lower extremity of a substantially frustro-conical downwardly outwardly flaring aperture in the top of said thimble, a dust cap plug permanently mounted in said thimble and removably slidably insertable in said thimble top aperture to minimize the entrance of objectionable dust and water thereinto when said plug is in its upwardly disposed normal position, an upwardly opening air seal valve cup at substantially the bottom of said dust cap plug, a yieldable valve material supported against radial dilation at both its radially inner and outer peripheries and disposed in said valve cup for engaging said valve seat in releasable air sealing relation therewith, a valve pin having its upper end mounted in said dust cap plug and extending downwardly of said thimble, a valve pin guide means apertured substantially centrally for the guidance of the lower end of said valve pin and supported by the lower end of said thimble, and means for yieldingly urging said valve material into releasable engagement with said thimble knife edge.

10. A capless valve core, comprising in combination, a substantially hollow thimble having a top portion apertured for the conducting of air therethru and threaded externally for being removably mounted in a stem, a knife edge valve seat defining the lower end of said thimble top aperture, a closure means permanently mounted in said thimble and having a portion removably insertable in and substantially closing said thimble top aperture for minimizing the passage of foreign matter therethru when said closure means is in its normally upwardly disposed position, an axially upstanding valve cup rim portion of said closure means spaced radially outwardly from the center thereof, yielding valve material supported by said closure means and disposed radially inwardly of and supported against radial spreading by said valve cup rim of said closure means and adapted for releasably engaging said knife edge valve seat in air sealing relation therewith intermediate said valve cup rim and said insertable portion of said closure means, a valve pin depending from said closure means, valve pin centering means in said thimble, and means yieldingly maintaining said valve in releasable engagement with said valve seat and supported in said thimble by said valve pin centering means.

ARTHUR KEEFE.